(12) United States Patent
Gokurakuji et al.

(10) Patent No.: US 10,678,604 B2
(45) Date of Patent: Jun. 9, 2020

(54) NETWORK FUNCTIONS VIRTUALIZATION MANAGEMENT AND ORCHESTRATION METHOD, NETWORK FUNCTIONS VIRTUALIZATION MANAGEMENT AND ORCHESTRATION SYSTEM, AND PROGRAM

(71) Applicant: NEC CORPORATION, Tokyo (JP)

(72) Inventors: Junichi Gokurakuji, Tokyo (JP); Mayo Oohira, Tokyo (JP); Hirokazu Shinozawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 270 days.

(21) Appl. No.: 15/543,277

(22) PCT Filed: Jan. 22, 2016

(86) PCT No.: PCT/JP2016/051900
§ 371 (c)(1),
(2) Date: Jul. 13, 2017

(87) PCT Pub. No.: WO2016/117697
PCT Pub. Date: Jul. 28, 2016

(65) Prior Publication Data
US 2018/0004576 A1 Jan. 4, 2018

(30) Foreign Application Priority Data

Jan. 23, 2015 (JP) ................................. 2015-011811

(51) Int. Cl.
*G06F 15/173* (2006.01)
*G06F 9/50* (2006.01)
(Continued)

(52) U.S. Cl.
CPC ........ *G06F 9/5077* (2013.01); *G06F 9/45558* (2013.01); *G06F 9/46* (2013.01);
(Continued)

(58) Field of Classification Search
CPC ...... G06F 9/45558; G06F 9/46; G06F 9/4868; G06F 2009/45562; G06F 2009/4557; G06F 9/5077
(Continued)

(56) References Cited

U.S. PATENT DOCUMENTS

2014/0201374 A1 7/2014 Ashwood-Smith et al.
2014/0317261 A1 10/2014 Shatzkamer et al.
(Continued)

FOREIGN PATENT DOCUMENTS

CN 102255762 A 11/2011
CN 104219127 A 12/2014
(Continued)

OTHER PUBLICATIONS

W. Shen, M. Yoshida, T. Kawabata, K. Minato and W. Imajuku, "vConductor: An NFV management solution for realizing end-to-end virtual network services," The 16th Asia-Pacific Network Operations and Management Symposium, Hsinchu, 2014, pp. 1-6. (Year: 2014).*

(Continued)

*Primary Examiner* — Taylor A Elfervig
(74) *Attorney, Agent, or Firm* — Sughrue Mion, PLLC

(57) ABSTRACT

A network functions virtualization management and orchestration system with a VNF descriptor (VNFD) including a information element that allows an instance created based on the VNFD to be distinguished by name. The information element includes an information element of a VM name that describes a naming rule for a virtual machine (VM).

9 Claims, 13 Drawing Sheets

(51) Int. Cl.
*G06F 9/46* (2006.01)
*G06F 9/455* (2018.01)
*G06F 9/48* (2006.01)

(52) U.S. Cl.
CPC .... *G06F 9/4868* (2013.01); *G06F 2009/4557* (2013.01); *G06F 2009/45562* (2013.01)

(58) Field of Classification Search
USPC ........................................................ 709/226
See application file for complete search history.

(56) References Cited

U.S. PATENT DOCUMENTS

| | | | |
|---|---|---|---|
| 2014/0317293 A1 | 10/2014 | Shatzkamer | |
| 2015/0381423 A1* | 12/2015 | Xiang | H04L 41/0893 709/223 |
| 2017/0249184 A1* | 8/2017 | Xie | G06F 9/455 |

FOREIGN PATENT DOCUMENTS

| | | |
|---|---|---|
| JP | 11-161579 A | 6/1999 |
| JP | 2002055892 A | 2/2002 |
| JP | 2012-133825 A | 7/2012 |
| WO | 2014/169870 A1 | 10/2014 |

OTHER PUBLICATIONS

H. Moens and F. D. Turck, "VNF-P: A model for efficient placement of virtualized network functions," 10th International Conference on Network and Service Management (CNSM) and Workshop, Rio de Janeiro, 2014, pp. 418-423. (Year: 2014).*
"Network Functions Virtualisation (NFV); Management and Orchestration", ETSI GS NFV-MAN 001, V1. 1. 1, Dec. 2014, http://www.etsi.org/deliver/etsi_gs/NFV-MAN/001_099/001/01.01.01_60/gs_NFV-MAN001v010101p.pdf.
International Search Report for PCT/JP2016/051900, dated Mar. 1, 2016.
Chris Takemura et al., "The Book of™ Xen, A Practical Guide for the System Administrator", published 2009, retrieved on Feb. 13, 2019 from: <https://books.google.ca/books?id=9284DkYwQCgC&pg=PA257&lpg=PA257&dq=uuid-of-the+-VM+in+xen&source=bl&ots=vkVxlQjDRK&sig=ACfU3U3rkjaEaOiBS-fHRhWUpXDMYi8sbg&hl=en&sa=X&ved=2ahUKEwikzfbZsrngAhUr7YMKHXs_A584ChDoATABegQICBAB#v=onepage&q&f=false>, 316 pages total.
"Viewing VM's on hypervisor", posted in 2016, < https://help.onapp.com/hc/en-us/articles/222046608-Viewing-VM-s-on-hypervisor>, 2 pages total.
"Finding which VM a disk belongs to", posted in 2016, <https://help.onapp.com/hc/en-us/articles/222050448-Finding-which-VM-a-disk-belongs-to>, 2 pages total.
Communication dated Feb. 19, 2019 issued by the Canadian Intellectual Property Office in counterpart application No. 2,974,630.
Communication dated Oct. 30, 2018, from Korean Intellectual Property Office in counterpart application No. 10-2017-7023557.
Communication dated Oct. 18, 2019, from the China National Intellectual Property Administration in counterpart Application No. 201680006829.X.

* cited by examiner

Network Service Descriptor(NSD)
Virtual Link Descriptor(VLD)
VNF Forwarding Graph Descriptor(VNFFGD)
VNF Descriptor (VNFD)
Physical Network Function Descriptor(PNFD)

Network Service Record (NSR)
VNFFG Record (VNFFGR)
Virtual Link Record (VLR)
VNF Record (VNFR)
PNF Record (PNFR)

FIG. 6
vnfd base information elements

| Identifier | Type | Cardinality | Description |
|---|---|---|---|
| Id | Leaf | 1 | ID (e.g., name) of this VNFD. |
| Vendor | Leaf | 1 | The vendor generating this VNFD. |
| descriptor_version | Leaf | 1 | Version of the VNF Descriptor |
| Version | Leaf | 1 | Version of VNF software, described by the descriptor under consideration |
| Vdu | Element | 1...N | This describes a set of elements related to a particular VDU, see section 6.3.1.2 |
| virtual_link | Element | 0...N | Represents the type of network connectivity mandated by the VNF vendor between two or more Connection Points, see section 6.3.1.3 |
| connection_point | Element | 1...N | This element describes an external interface exposed by this VNF enabling connection with a VL, see section 6.3.1.4. NOTE: The connection between the VNF and the VL is expressed by the VLD referencing this Connection Point. The Connection Point may also be attached to internal Virtual Vinks (vnfd:virtual_link:id). |
| lifecycle_event | Leaf | 0...N | Defines VNF functional scripts/workflows for specific lifecycle events (e.g., initialization, termination, graceful shutdown, scaling out/in, update/upgrade, VNF state management related actions to support service continuity) |
| Dependency | Leaf | 0...N | Describe dependencies between VDUs. Defined in terms of source and target VDU, i.e., target VDU "depends on" source VDU. In other words sources VDU must exists before target VDU can be initiated/deployed, |
| monitoring_parameter | Leaf | 0...N | Monitoring parameters, which can be tracked for this VNF. Can be used for specifying different deployment flavours for the VNF in a VNFD. and/or to indicate different levels of VNF service availability. These parameters can be an aggregation of the parameters at VDU level e.g., memory-consumption, CPU-utilisation, bandwidth-consumption etc. They can be VNF specific as well such as calls-per-second (cps), number-of-subscribers, no-of-rules, flows-per-second, VNF downtime. etc. One or more of these parameters could be influential in determining the need to scale. |
| deployment_flavour | Element | 1...N | Represents the assurance parameter(s) and its requirement for each deployment flavour of the VNF being described, see section 6.3.1.5 |
| auto_scale_policy | Leaf | 0...N | Represents the policy meta data, which may include the criteria parameter and action-type. The criteria parameter should be a supported assurance parameter (vnf:monitoring_parameter). Example of such a descriptor could be Criteria parameter → calls-per-second Action-type → scale-out to a different flavour ID, if exists |
| manifest_file | Leaf | 0...1 | The VNF package may contain a file that lists all files in the package. This can be useful for auditing purposes or for enabling some security features on the package. |
| manifest_file_security | Leaf | 0...N | The manifest file may be created to contain a digest of each file that it lists as part of the package. This digest information can form the basis of a security mechanism to ensure the contents of the package meet certain security related properties. If the manifest file contains digests of the files in the package, then the manifest file should also note the particular hash algorithm used to enable suitable verification mechanisms. Examples of suitable hash algorithms include, but are not limited to SHA-256, SHA-384, SHA-512, and SHA-3. In conjunction with an appropriate security signing mechanism, which may include having a security certificate as part of the VNF package, the digest information can be used to help ensure the contents of the VNF package have not been tampered with. |

FIG. 7A vnfd: vdu base elements

| Identifier | Type | Cardinality | Description |
|---|---|---|---|
| id | Leaf | 1 | A unique identifier of this VDU within the scope of the VNFD, including version functional description and other identification information. This will be used to refer to VDU when defining relationships between them. |
| vm_image | Leaf | 0...1 | This provides a reference to a VM image. NOTE: A cardinality of zero allows for creating empty virtualisation containers as per [NFVSWA001]. |
| computation_requirement | Leaf | 1 | Describe the required computation resources characteristics (e.g., processing power, number of virtual CPUs, etc.), including Key Quality Indicators (KQIs) for performance and reliability/availability. |
| virtual_memory_resource_element | Leaf | 1 | This represents the virtual memory needed for the VDU |
| virtual_network_bandwidth_resource | Leaf | 1 | This represents the requirements in terms of the virtual network bandwidth needed for the VDU |
| lifecycle_event | Leaf | 0...N | Defines VNF component functional scripts/workflows for specific lifecycle events (e.g. initialization, termination, graceful shutdown, scaling out/in) |
| constraint | Leaf | 0...1 | Placeholder for other constraints. |
| high_availabilityA | Leaf | 0...1 | Defines redundancy model to ensure high availability examples include:<br>• ActiveActive: Implies that two instance of the same VDU will co-exists with continuous data synchronization.<br>• ActivePassive: Implies that two instance of the same VDU will co-exists without any data synchronization. |
| scale_in_out | Leaf | 0...1 | Defines minimum and maximum number of instances which can be created to support scale out/in. |
| vnfc | Element | 1...N | Contains information that is distinct for each VNFC created based on this VDU. |
| monitoring_parameter | Leaf | 0...N | Monitoring parameter, which can be tracked for a VNFC based on this VDU Examples include: memory-consumption, CPU-utilisation, bandwidth-consumption, VNFC downtime, etc. |

FIG. 7B

VNFC (vnfd:vdu:vnfc)

| Identifier | Type | Cardinality | Description |
|---|---|---|---|
| id | Leaf | 1 | Unique VNFC identification within the namespace of a specific VNF. |
| connection_point | Element | 1...N | Describes network connectivity between a VNFC instance (based on this VDU) and an internal Virtual Link. |

FIG. 7C

Connection Point (vnfd:vdu:vnfc:connection_point)

| Identifier | Type | Cardinality | Description |
|---|---|---|---|
| id | Leaf | 1 | ID of the Connection Point. |
| virtual_link_reference | Reference | 1 | References an internal Virtual Link (vnfd:virtual_link:id, see section 6.3.1.3) to which other VNFCs can connect. |
| type | Leaf | 1 | This may be, for example, a virtual port, a virtual NIC address, a physical port, a physical NIC address or the endpoint of an IP VPN enabling network connectivity. |

FIG. 8A

– vnfd:vdu information elements related to storage

FIG. 8B

| storage_requirement | Leaf | 0...1 | Required storage characteristics (e.g. size), including Key Quality Indicators (KQIs) for performance and reliability/availability. |
|---|---|---|---|
| rdma_support_bandwitdh | Leaf | 0...1 | The VDU may have been developed, optimized or tested with a storage supporting RDMA over a given bandwidth. |

FIG. 8C

| Identifier | Type | Cardinality | Description |
|---|---|---|---|
| id | Leaf | 1 | Unique identifier of this internal Virtual Link |
| connectivity_type | Leaf | 1 | Connectivity type (e.g., E-Line, E-LAN or E-Tree). |
| connection_points_references | Reference | 2...N | References to Connection Points (vnfd:vdu:vnfc:connection_point:id, vnfd:connection_point:id), e.g., of type E-Line, E-Tree, or E-LAN. |
| root_requirement | Leaf | 1 | Describes required throughput of the link (e.g., bandwidth of E-Line, root bandwidth of E-Tree, and aggregate capacity of E_LAN) |
| leaf_requirement | Leaf | 0...1 | Describes required throughput of leaf connections to the link (for E-Tree and E-LAN branches) |
| qos | Leaf | 0...N | Describes the QoS options to be supported on the VL e.g., latency, jitter etc. |
| test_access | Leaf | 0...1 | Describes the test access facilities to be supported on the VL (e.g., none, passive monitoring, or active (intrusive) loopbacks at endpoints |

| Identifier | Type | Cardinality | Description |
|---|---|---|---|
| id | Leaf | 1 | ID of the Connection Point. |
| virtual_link_reference | Reference | 0...1 | References an internal Virtual Link (vnfd:virtual_link:id, see section 6.3.1.3) to which other VDUs, NFs, and other types of endpoints can connect. |
| type | Leaf | 1 | This may be for example a virtual port, a virtual NIC address, a physical port, a physical NIC address or the endpoint of an IP VPN enabling network connectivity. |

FIG. 9A

– Deployment flavour element (vnfd:deployment_flavour)

| Identifier | Type | Cardinality | Description |
|---|---|---|---|
| id | Leaf | 1 | ID of the VNF flavour |
| flavour_key | Leaf | 1 | Monitoring parameter & its value against which this flavour is being described. The parameters should be present as a vnfd:monitoring_parameter, see section 6.3.1.1.<br>An example is a flavour of a virtual PGW could be described in terms of the parameter "calls per second"<br>There could be a flavour describing what it takes to support a VPGW with 10k calls per second. |
| constraint | Leaf | 0...N | Constraint that this deployment flavour can only meet the requirements on certain hardware |
| constituent_vdu | Element | 1...N | Represents the characteristics of a constituent flavour element, see section 6.3.1.6.<br>Examples include Control-plane VDU & Data-plane VDU & Load Balancer VDU Each needs a VDU element to support the deployment flavour of 10k calls-per-sec of vPGW, Control-plane VDU may specify 3 VMs each with 4 GB vRAM, 2 vCPU, 32 GB virtual storage etc.<br>Data-plane VDU may specify 2 VMs each with 8 GB vRAM, 4 vCPU, 64 GB virtual storage etc. |

FIG. 9B

Constituent VDU (vnfd:deployment_flavour:constituent_vdu)

| Identifier | Type | Cardinality | Description |
|---|---|---|---|
| vdu_reference | Reference | 1 | References a VDU which should be used for this deployment flavour by vnfd:vdu:id, see section 6.3.1.2.1. |
| number_of_instances | Leaf | 1 | Number of VDU instances required |
| constituent_vnfc | Reference | 1...N | References VNFCs which should be used for this deployment flavour by vnfd:vdu:vnfc:id |

FIG. 10

VNFD  Vnfd  base information elements

| Identifier | Type | Cardinality | Description |
|---|---|---|---|
| Id | Leaf | 1 | ID (e.g., name) of this VNFD. |
| Vendor ... | Leaf | 1 | The vendor generating this VNFD. |
| descriptor_version | Leaf | 1 | Version of the VNF Descriptor |
| Version | Leaf | 1 | Version of VNF software, described by the descriptor under consideration |
| vdu | Element | 1..N | This describes a set of elements related to a particular VDU. |
| ... | | | |
| VM name | Leaf | 1...N | NAMING RULE FOR VM |

NETWORK FUNCTIONS VIRTUALIZATION MANAGEMENT AND ORCHESTRATION METHOD, NETWORK FUNCTIONS VIRTUALIZATION MANAGEMENT AND ORCHESTRATION SYSTEM, AND PROGRAM

CROSS REFERENCE TO RELATED APPLICATIONS

This application is a National Stage of International Application No. PCT/JP2016/051900 filed Jan. 22, 2016, claiming priority based on Japanese Patent Application No. 2015-011811 filed Jan. 23, 2015, the contents of all of which are incorporated herein by reference.

CROSS-REFERENCE TO RELATED APPLICATIONS

The present invention is based upon and claims the benefit of the priority of Japanese Patent Application No. 2015-011811 (filed on Jan. 23, 2015), the disclosure of which is incorporated herein in its entirety by reference.

FIELD

The present invention relates to a network management and orchestration technology. More specifically, the invention relates to a method, a system, and a program suitable for being applied to network functions virtualization (Network Functions Virtualization) management and orchestration.

BACKGROUND

There is known NFV (Network Functions Virtualization) or the like configured to implement a network apparatus and so on in software, using a virtualization technology that virtualizes hardware resources (computing, storage, network functions and so on) of a server by a virtual machine (VM: Virtual Machine) implemented on a virtualization layer (Virtualization Layer) such as a hypervisor (HyperVisor) on the server. The NFV is implemented, based on a MANO (Management & Orchestration) architecture, for example. FIG. 1 is a diagram cited from FIG. 5.1 (The NFV-MANO architectural framework with reference points) on page 23 of Non-Patent Literature 1.

Referring to FIG. 1, VNF (Virtualized Network Function) corresponds to an application or the like running on a virtual machine (VM) on a server, and implements a network function in software. As VNF, MME (Mobility Management Entity), S-GW (Serving Gateway), P-GW (PDN Gateway), and so forth on EPC (Evolved Packet Core) that is a core network of LTE (Long Term Evolution) network may be implemented by software (virtual machine). In the example of FIG. 1, a management function referred to as EM (Element Manager: element management) is provided for each VNF, for example.

NFVI (Network Functions Virtualization Infrastructure) that constitutes an implementation infrastructure of each VNF is an infrastructure that allows hardware resources of a physical machine (server) such as computing, storage, and network functions to be flexibly handled as virtualized hardware resources such virtualized computing, virtualized storage, virtualized network, and so on which have been virtualized using a virtualization layer such as a hypervisor.

NFV MANO (Management & Orchestration) includes an NFV-Orchestrator (NFVO), a VNF-manager (VNFM), and a Virtualized Infrastructure Manager (VIM).

The NFV-Orchestrator (NFVO) performs orchestration of NFVI resources and lifecycle management (such as Instantiation, Scaling, Termination, and Update of each NS instance) of NSs (Network Services). The NFV-Orchestrator also performs management of an NS catalog (NSD/VLD/VNFFGD) and a VNF catalog (VNFD/VM images/manifest files, etc.), and includes a repository of NS instances and a repository of the NFVI resources.

The VNF-Manager (VNFM) performs VNF lifecycle management (such as instantiation, update, query, scaling, termination, etc.) and event notification.

The virtualized Infrastructure Manager (VIM) performs control of the NFVI (such as computing, storage, network resource management, fault monitoring of the NFVI being the implementation infrastructure of the NFV, and monitoring of resource information) through the virtualization layer.

OSS (Operations Support Systems) are a generic term for systems (such as apparatuses, software, and schemes) necessary for telecommunications carriers (carriers) to construct and manage services, for example. BSS (Business Support systems) are a generic term for information systems (such as apparatuses, software, and schemes) to be used for accounting for and charging of a usage charge and handling of a customer by the telecommunications carriers.

The NS Catalogue (NS catalog: an NS Catalogue in FIG. 1) represents repository of network Services. NS Catalogue supports creation and management of NS deployment templates (Network Service Descriptor (NSD), Virtual Link Descriptor (VLD), and VNF Forwarding Graph Descriptor (VNFFGD)).

The VNF catalog (VNF catalog: a VNF Catalogue in FIG. 1) represents repository of VNF packages. The VNF catalog supports creation and management of each VNF package of a VNF Descriptor (VNFD), a software image, a manifest file and so forth.

The NFV instance repository (NFV instance Repository: NFV Instances in FIG. 1) holds information of all VNF instances and Network Service instances. Each VNF instance and each NS instance are represented respectively by a VNF record and by an NS record. Those records are updated during a lifecycle of the respective instances, reflecting changes resulting from execution of NS lifecycle management operations and/or VNF lifecycle management operations.

The NFVI resources repository (NFVI Resources Repository: NFVI Resources in FIG. 1) holds information on available/reserved/allocated resources as extracted by the VIM across operator's infrastructure domains.

Referring to FIG. 1, a reference point Os-Nfvo is a reference point between the OSS (Operations Support Systems)/BSS (Business Support Systems) and the NFVO, and is used for forwarding a lifecycle management request of each network service, a VNF lifecycle management request, state information associated with NFV, exchange of policy management information, and so on.

A reference point Vnfm-Vi is used for a resource allocation request from the VNFM and exchange of virtualized resource configuration and state information.

A reference point Ve-Vnfm-em is used between the EM and the VNFM for VNF instantiation, VNF instance retrieval, VNF instance update, VNF instance termination, VNF instance scaling-out/in, VNF instance scaling-up/down, forwarding of configuration and events from the EM to the VNFM, and notification of configuration and events regarding the VNF from the VNFM to the EM, and so on.

A reference point Ve-Vnfm-Vnf is used between the VNF and the VNFM for VNF instantiation, VNF instance retrieval, VNF instance update, VNF instance termination, VNF instance scaling-out/in, VNF instance scaling-up/down, forwarding of configuration and events from the VNF to the VNFM, and notification of configuration and events regarding the VNF from the VNFM to the VNF, and so on.

A reference point Nf-Vi is used for VM allocation with indication of compute/storage resource, update of VM resources allocation, VM migration, VM termination, creation and removal of connection between VMs, etc., virtual resources allocation in response to a resource allocation request, forwarding of virtual resource state information, exchange of configuration and state information of hardware resources, and so on.

A reference point Vn-Nf indicates an execution environment to be provided to the VNF by the NFVI.

A reference point Nfvo-Vnfm is used for a resource-related request (of validation, reservation (reservation), or allocation, etc.) by the VNF-manager (VNFM) and forwarding of configuration information to the VNFM, and collection of VNF state information.

A reference point Nfvo-Vi is used for a resource reservation request and a resource allocation request from the NFVO, and exchange of virtual resource configuration and state information (for details, reference may be made to Non-Patent Literature 1).

FIG. 2 is cited from FIG. 6.2 (Information elements in different context) on page 40 of Non-Patent Literature 1. An instantiation input parameter is input.

Referring to FIG. 2, a network service descriptor (Network Service Descriptor: NSD) is a network service deployment template for referencing other descriptors that describe components constituting a network service (NS).

A VNF descriptor (VNF Descriptor: VNFD) is a deployment template that describes a VNF in terms of deployment and operational behavior requirements.

The VNFD is mainly used by the VNFM in VNF instantiation (instantiation) and VNF instance lifecycle management. The VNFD is used for a network service and management and orchestration of virtualized resources on the NFVI (automation of deployment/setting/management of a computer system/middleware/service) by the NFVO. The VNFD also contains connectivity, interface and KPIs requirements that can be used by NFV-MANO functional blocks to establish appropriate Virtual Links within the NFVI between its VNFC instances, or between a VNF instance and the endpoint interface to the other network functions.

A VNF Forwarding Graph Descriptor (VNFFGD) is a deployment template that describes a network service topology or a part of the topology by referring to the VNFs, PNFs, and Virtual Links connecting those VNFs and PNFs.

A virtual link descriptor (Virtual Link Descriptor: VLD) is a deployment template that describes resource requirements necessary for links between the VNFs, between the PNFs, and between NS endpoints (endpoints) that can be used by the NFVI.

A physical network function descriptor (Physical Network Function Descriptor: PNFD) describes connectivity (connectivity), interface and KPIs requirements of a virtual link, for a function of an attached physical network. The PNFD is needed when a physical device is incorporated into an NS, and facilitates addition of a network.

The NSD, the VNFFGD, and the VLD are included in the NS catalog (Network Service Catalogue in FIG. 2), and the VNFD is included in the VNF catalogue (VNF Catalogue in FIG. 2) as the VNF package.

An NS or a VNF instantiation operation is performed from the OSS/BSS or the VNFM to the NFVO. As a result of the instantiation operation, each record indicating a newly created instance is created. Each record to be created based on information to be given by each descriptor and additional runtime information related to a component instance provides data for modeling a network service (NS) instance state, for example.

As types of the instance records (of NFV Instances) to be created, there may be listed the following types, for example:

Network Service Record (NSR);

VNFFG Record (VNFFGR);

Virtual Link Record (VLR);

VNF (Virtualized Network Function) Record (VNFR); and

PNF (Physical Network Function) Record (PNFR).

Information elements of the NSR, the VNFR, the VNFFGR, and the VLR provide a data item group necessary for modeling states of an NS instance, a VNF instance, a VNFFG instance, and a VL instance.

The PNF Record (PNFR) indicates an instance related to a pre-existing PNF which is part of an NS and contains a set of runtime attributes regarding PNF information (including connectivity relevant to the NFVO). An overview of each element of the NFV is summarized as lists in Tables 1 and 2.

TABLE 1

| Functional Entity | Description |
| --- | --- |
| OSS/BSS | Comprehensively performs operations/business support. A plurality of EMSs and Orchestrator are deployed on a low-order layer of OSS/BSS. |
| Orchestrator | Orchestration across a plurality of VIMs Management of NS(Network Service) deployment templates and VNF packages Management of instantiation and lifecycle management of NSs Management of instantiation of VNFM Management of VNF instantiation in coordination with VNFM Validation and authorization of NFVI resource request from VNFM Management of integrity and visibility of NS instances through their lifecycle Management of relationship between NS instances and VNF instances, using NFV instances Repository Topology management of NS instances Automated management of NS instances |
| VNF-Manager | Performs VNF lifecycle management * and event notification management. * Instantiation, Auto-Scaling, Auto-Healing, Update, and so on |
| Virtualized Infrastructure Manager (VIM) | Performs resource management and control of NFV infrastructure as follows: Management of computing, storage, and network resources Resource allocation in response to a request Monitoring of a fault state of NFV Infrastructure Monitoring of resource information of NFV Infrastructure |

TABLE 2

| Functional Entity | Description |
| --- | --- |
| Service VND and Infrastructure Description | Defines information templates that become necessary for deploying each Network Service and each VNF<br>NSD: a template that describes requirements and constraint conditions necessary for deployment of the NS<br>VLD: describes resource requirements of a logical link connecting VNFs or connecting PNFs that constitute NS<br>VNFGD: a template that describes a logical topology for and assignment of NS<br>VNFD: a template that describes requirements and constraint conditions necessary for deploying VNF<br>PNFD: describes, for a physical network function, connectivity, external interface, and KPIs requirements of aVL. |
| NS Catalogue | Repository of NSs<br>Management of NS deployment templates (NSD, VLD, VNFFGD) |
| VNF Catalogue | Describes repository of each VNF.<br>Management of each VNF package (VNFD, software images, manifest files, etc.) |
| NFV Instances Repository | Holds instance information of all the VNFs and all the NSs.<br>Information on each instance is described in Record.<br>Record is updated according to lifecycle of each instance. |
| NFVI Resources Repository | Holds information of NFVI resources (NFVI resources as abstracted by VIM across operator's Infrastructure Domains) that are available/reserved/allocated, for abstraction |
| VNF | Refers to a virtualized Network Function and refers to a VM (e.g., MME, SGW, PGW or the like) in which an EPC application is installed, being configured with VNF. |
| EMS | Performs management of FCAPS (FCAPS: Fault, Configuration, Accounting, Performance and Security) of VNF. |
| NFVI | A resource infrastructure in which VNF is executed. Comprises computing, a storage, and a network. Physical resources are abstracted by hypervisor and abstracted resources are managed and controlled by VIM and are provided to VNF. |

CITATION LIST

Non-Patent Literature

Non-Patent Literature 1
ETSI GS NFV-MAN 001 V1.1.1 (2014-12) Network Functions Virtualisation (NFV); Management and Orchestration http://www.etsi.org/deliver/etsi_gs/NFV-MAN/001_099/001/0.01.01_60/gs_NFV-MAN001v010101p.pdf

SUMMARY

An analysis by the inventor of the present invention will be given below.

An example of a relationship among VNF, VNFCs (VNF Components) and VDU (Virtualization Deployment Unit) will be described, with reference to FIG. 3. FIG. 3 schematically illustrates an example where VNFC is set for each logical interface in a VNF obtained by virtualizing an S-GW (Serving gateway). Each VDU is an entity used for an information model configured to support description of partial or whole deployment and operational behaviors of the VNF. NFVI configured to provide an implementation infrastructure of the VNF includes a virtual computing, a virtual storage, and a virtual network, each virtualized on a virtualization layer such as a hypervisor. There is provided a virtual machine on a virtualization layer (where the virtual machine includes a virtual CPU (Central Processing Unit), a virtual memory, a virtual storage, and a guest OS (Operating System)), with an application being executed on the guest OS. Compute, Storage, and Network below the virtualization layer schematically represent hardware resources such as a CPU, a storage, and a network interface controller (Network Interface Controller: NIC). Vn-Nf represents an execution environment to be provided to the VNF by the NFVI.

In FIG. 3, where SGW is constituted by VNF, VNFC is configured for each logical interface, logical interfaces S11, Gx, and S5/S8-C with respect to C-Plane (Control Plane) are collectively defined as one VDU (VM), and logical interfaces S1U, S5/S8-U, and S12 with respect to U-Plane are collectively defined as one VDU (VM). C in S5/S8-C represents a control plane (Control Plane). U in the S1U and S5/S8-U represents a user plane (User-plane).

In EPC, S11 is a control plane interface between MME and SGW, S5/S8 is a user plane interface between SGW and PGW, S1U is an interface between eNodeB (evolved NodeB) and Core Network, Gx is an interface between PGW and PCRF (Policy and Charging Rules Function), S11 is an interface between MME and S-GW, S12 is an interface between UTRAN (Universal Terrestrial Radio Access Network) and S-GW.

When congestion of control signals occurs, VMs corresponding to S11, Gx, and S5/S8-C (in which C represents a control plane (Control Plane)), for example, are added (increased) (Scaled-out).

When congestion of data signals occurs, a VM corresponding to S1U, and S5/S8-U (in which U represents a user plane (User-Plane)) are added (increased) (Scaled-out).

FIG. 4 is a diagram illustrating a logical relationship among respective descriptors (cited from FIG. 6.4 on page 60 of Non-Patent Literature 1). FIG. 4 illustrates relationships between internal virtual links (internal Virtual Links) and external virtual links (external Virtual Links). FIG. 4 also illustrates relationships of connection points (Connection Points) among VNFs, VNFCs, and VLs (Virtual Links) in a network service (NS).

FIG. 5 is a diagram schematically illustrating a structure (hierarchical structure, or a tree structure) of a VNF descriptor (VNFD) in Non-Patent Literature 1 with respect to a standard specification of NFV-MANO (reference mat be made to Non-Patent Literature 1). FIG. 6 is a diagram obtained by citing 6.3.1.1 (vnfd base information elements) on page 44 of Non-Patent Literature 1, and is a diagram illustrating basic information elements of the VNF descriptor (VNFD) that is the deployment template describing a VNF in terms of deployment and operational behavior requirements.

An entry (element) whose type is a leaf (Leaf) in FIG. 6 and so on designates a leaf (end node) in a template of a tree structure (hierarchical structure), and indicates an element including no other element. Generally, the leaf element is an empty element or a text. Element (Element Tree) includes a child node (having an ID).

Regarding VNFD that is a root element of the template of the tree structure (hierarchical structure), the there are defined on the same layer as VNFD following information items that define requirements and constraint conditions for VNF:

VDU (Virtualized Deployment Unit);
virtual link (Virtual Link) (0 to N);
connection points (Connection Points) (1 to N); and
deployment flavor (Deployment Flavor) (1 to N), where N is an integer not less than 1.

FIG. 7A is a diagram illustrating VDU base elements (vdu base elements) defined in a form of a table (6.3.1.2.1 in Non-Patent Literature 1). VDU includes one or more VNFCs as child nodes, as information defining requirements and constraint conditions for the VDU constituting VNF. Information elements of VNFC are illustrated in FIG. 7B (reference may be made to 6.3.1.2.1.1 in Non-Patent Literature 1). VNFC includes one or more connection points (Connection point) as leaf elements. Information elements of connection point (Connection point) are illustrated in FIG. 7C (reference may be made to 6.3.1.2.1.2 in Non-Patent Literature 1).

For VDU, requirements and constraint conditions for various resources to be used by VDU (VDU information on CPUs, virtual switches, security, hypervisor, PCIe (PCI express), reliability and availability (reliability and availability), and storage (see FIG. 8A: reference may be made to 6.3.1.2.10 in Non-Patent Literature 1), network interface, and so on, for example) are defined. As illustrated in FIG. 9A, the template (descriptor) of the storage includes a storage requirement (storage requirement), an rdma (Remote Direct Memory Access)-support-bandwidth, and so on, as leaf elements. Herein, information elements of the storage are illustrated, as an example. With respect to information elements such as CPUs, virtual switches, security, hypervisor, PCIe (PCE express), and reliability and availability, Non-Patent Literature 1 may be referred to as necessary.

Templates for virtual link (Virtual Link), connection point (Connection Point), deployment flavor (Deployment Flavor), and Constituent VDU in the VNF descriptor (VNFD) in FIG. 5 are respectively illustrated in FIG. 8B, FIG. 8C, FIG. 9A, and FIG. 9B. Regarding the virtual link (Virtual Link), connection point (Connection Point), deployment flavor (Deployment Flavor), and Constituent VDU, reference may be made respectively to 6.3.1.3. in Non-Patent Literature 1, 6.3.1.4 in Non-Patent Literature 1, 6.3.1.5 in Non-Patent Literature 1, and 6.3.1.5.1 in Non-Patent Literature 1.

In carrier's operations sing a dedicated hardware-based network apparatus (Network Appliance), name mapping and management may be performed for each hardware apparatus so that the following data, for example, may be immediately determined, in order to streamline operation and management and to identify a corresponding portion of a fault at a time of the fault:

which station house (building);
communication node; and
function.

To take an example, a name "Osaka SGW001-U-Plane001" assigned to a hardware apparatus of a gateway, a network apparatus, or the like indicates a U-Plane (User-Plane) function "001" of a service gateway (SGW) "SGW001" of "Osaka building".

There is a similar need for an NFV architecture as well. It is important to manage which type of VNF/VNFC (VNF Component) instance (VM: Virtual Machine) is running on which hardware that is separated from software by virtualization (findings by the inventors of the present invention).

In the standard specification for NFV described with reference to FIG. 6 and so on, for example, with respect to VNF descriptor (VNFD), VDU, and VNFC, an ID can be given for each VNFD, for each VDU, and for each VNFC, as illustrated in FIG. 6, FIG. 7A, and FIG. 7B, respectively.

However, in terms of the standard specification for NFV, a name (VM Name) cannot be given for each VM (instance). In VNF descriptor (VNFD) according to the standard specification for NFV described with reference to FIG. 6 and so on, for example, it is possible incorporate up to the following:

VNF ID, such as "SGW", may be given for VNF; and
VNFC ID may be given as VNFC.

However, which node of SGWs or which instance of a GWU (gateway unit) cannot be specified (according to findings by the inventors of the present invention).

With respect to the VNF descriptor in the above-mentioned standard specification, when a plurality of virtual machines (VMs) are generated at a time of addition (creation) of virtual machines VM on a server for auto scaling (scaling-out), for example, a same VNFC ID is given to the plurality of virtual machines (VMs), thus leading to a situation where distinction among instances cannot be made, in terms of management (findings by the inventors of the present invention).

Accordingly, the present invention has been devised in view of the above-mentioned problem, and it is an object of the present invention to provide a network functions virtualization management and orchestration method, a network functions virtualization management and orchestration system, and a medium storing a program that allow distinction of an instance created based on a descriptor, in terms of management.

According to one aspect of the present invention, there is provided a method comprising: receiving information of a template from a storage unit; and creating an instance based on the information of the template, wherein an information element that allows the instance to be distinguished by name is provided in the template that is stored in the storage unit. The information element that allows the instance to be distinguished by name includes an information element that gives a naming rule for a name of the instance. According to the present invention, there is provided a network functions virtualization (NFV) management and orchestration method comprising: providing, in a VNF (Virtualized Network Function) descriptor (VNFD), for example, an information element that gives a naming rule for a name of an instance, to allow an instance that is created based on information of the VNFD to be distinguished by name.

According to another aspect of the present invention, there is provided a system including an input unit that receives information of a template from a storage unit; and a creation unit that creates an instance based on the information of the template, wherein the template includes an information element that allows an instance created based on the information of the template to be distinguished by name. The information element that allows an instance to be distinguished by name includes an information element that gives a naming rule for the name of the instance. According to the present invention, there is provided a system (NFV-MANO) including a unit that receives, for example, a VNF (Virtualized Network Function) descriptor (VNFD) with an information element that gives a naming rule for a name of an instance and a nnit that creates an instance based on information of the VNFD.

According to yet another aspect of the present invention, there is provided a non-transitory computer-readable recording medium storing therein a program causing a computer to execute processing comprising:

receiving, from a storage unit, a template including an information element that allows an instance created based on information of the received template to be distinguished by name; and creating the instance based on the information of the received template.

The information element that allows an instance to be distinguished by name includes an information element that gives a naming rule for the name of the instance. According to the present invention, there is provided a non-transitory computer-readable recording medium storing therein a program causing a computer to execute processing comprising: receiving, for example, a VNF (Virtualized Network Function) descriptor (VNFD) with an information element that gives a naming rule for a name of an instance and creating the instance based on information of the VNFD. According to the present invention, the non-transitory computer readable recording medium may be such as a magnetic disk or a semiconductor memory storing the computer program therein.

According to the present invention, distinction of an instance created based on the template (descriptor) is made possible, in terms of management.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 is a diagram illustrating information elements in a table of the VNF descriptor (vnfd) (cited from 6.3.1.1 in Non-Patent Literature 1).

FIG. 7A is a diagram illustrating information elements of VDU

FIG. 7B is a diagram illustrating information elements of VNFC

FIG. 7C is a diagram illustrating information elements of Connection point (FIGS. 7A-7C: respectively cited from 6.3.1.2.1, 6.3.1.2.1.1, and 6.3.1.2.1.2 in Non-Patent Literature 1).

FIG. 8A is a diagram illustrating VDU information elements related to storage

FIG. 8B is a diagram illustrating information elements of each VNF internal Virtual Link.

FIG. 8C is a diagram illustrating information elements of Connection points (FIGS. 8A-8C: cited from 6.3.1.2.10 in Non-Patent Literature 1).

FIG. 9A is a diagram illustrating information elements of deployment flavor (Deployment Flavor).

FIG. 9B is a diagram illustrating information elements of each constituent VDU (FIGS. 9A-9: cited respectively cited from 6.3.1.5 and 6.3.1.5.1 in Non-Patent Literature 1).

FIG. 10 is a diagram illustrating information elements of a VNF descriptor (vnfd) in an exemplary embodiment.

PREFERRED MODES

According to one of some exemplary embodiments, a VNF (Virtualized Network Function) descriptor (VNFD) includes an entry (information element) of a VM name that describes a naming rule for a virtual machine (VM) on the same layer (immediately below a VNFD root) as information elements of an identifier (ID) and a VDU (Virtualized Deployment Unit), for example. An instance (virtual machine (VM) or the like) that is created based on the descriptor may be distinguished by name. This enables distinction among instances (VMs or the like) in terms of management.

As described above, in the standard specification for NFV, with respect to VNFD, VDU, and VNFC, an ID can be given for VNFD, for VDU, and for VNFC, as illustrated in FIG. 6, FIG. 7A, and FIG. 7B, respectively. However, a name cannot be given for VM (instance), for example, as a result of which, when congestion (processing congestion due to a load that has exceeded capability of VM), a fault, or the like occurs and scaling-out (such as addition of a VM) is performed, for example, distinction cannot be made among of VMs (instances), in terms of management. A similar problem may occur in the case of VNF or VDU as well.

In order to solve this type of problem, according to the present exemplary embodiment, as illustrated in FIG. 10, for example, an information element (VM name) that gives a naming rule for a VM name is provided as a type of leaf (Leaf), for example, on the same layer as entries such as an identifier (ID (identifier)), a vendor (Vendor), a version (Version), and a VDU located on a layer immediately below a root, for example, in a VDN descriptor (VNFD).

Figure 5:
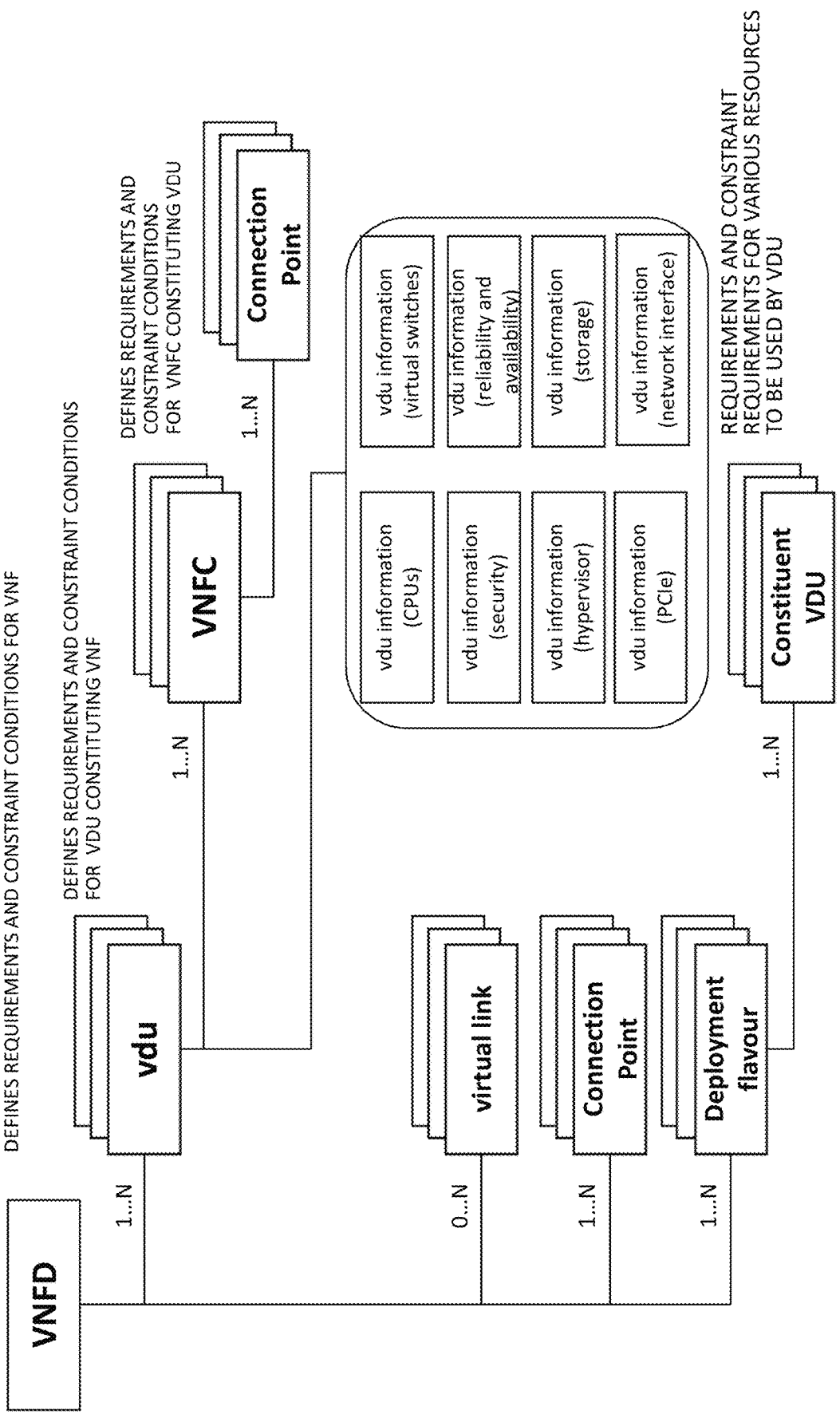
FIG. 5 is a diagram schematically illustrating a structure of a VNF descriptor (vnfd).
Figure 11:
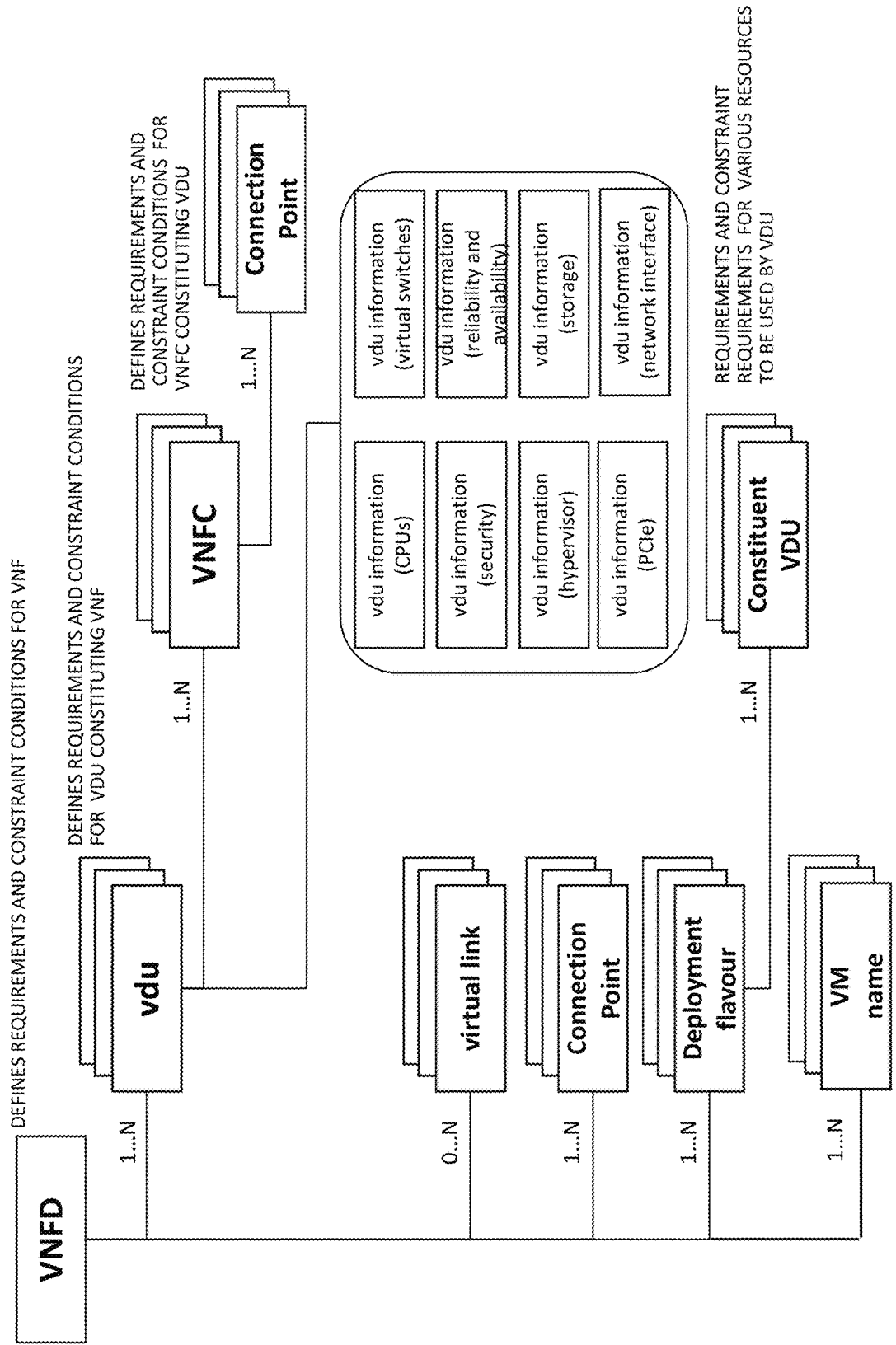
FIG. 11 is a diagram schematically illustrating a structure of the VNF descriptor (vnfd) in the exemplary embodiment.

FIG. 11 is a diagram illustrating a structure of a VNF descriptor in the exemplary embodiment illustrated in FIG. 10 and corresponds to FIG. 5 described above.

Figure 1:
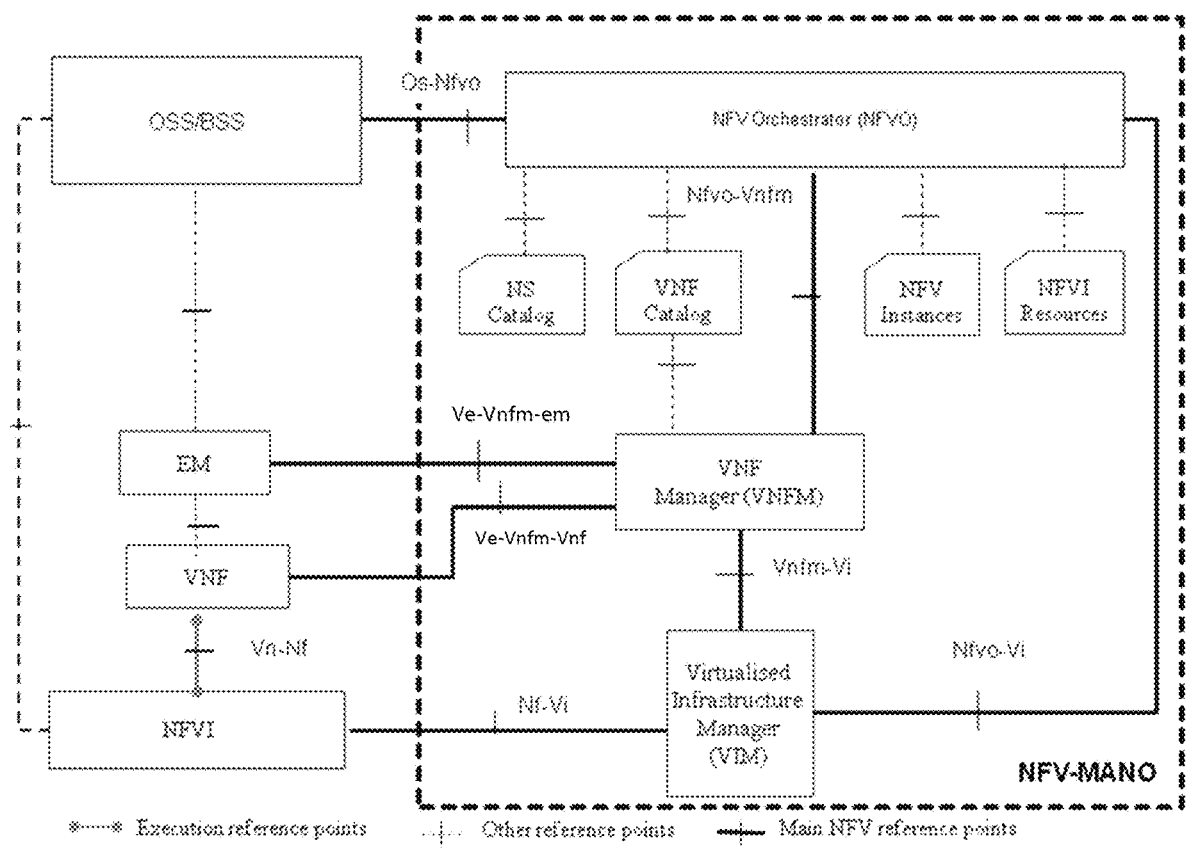
FIG. 1 is a diagram illustrating NFV-MANO of an NFV architecture (cited from FIG. 5.1 in Non-Patent Literature 1).
Figure 2:
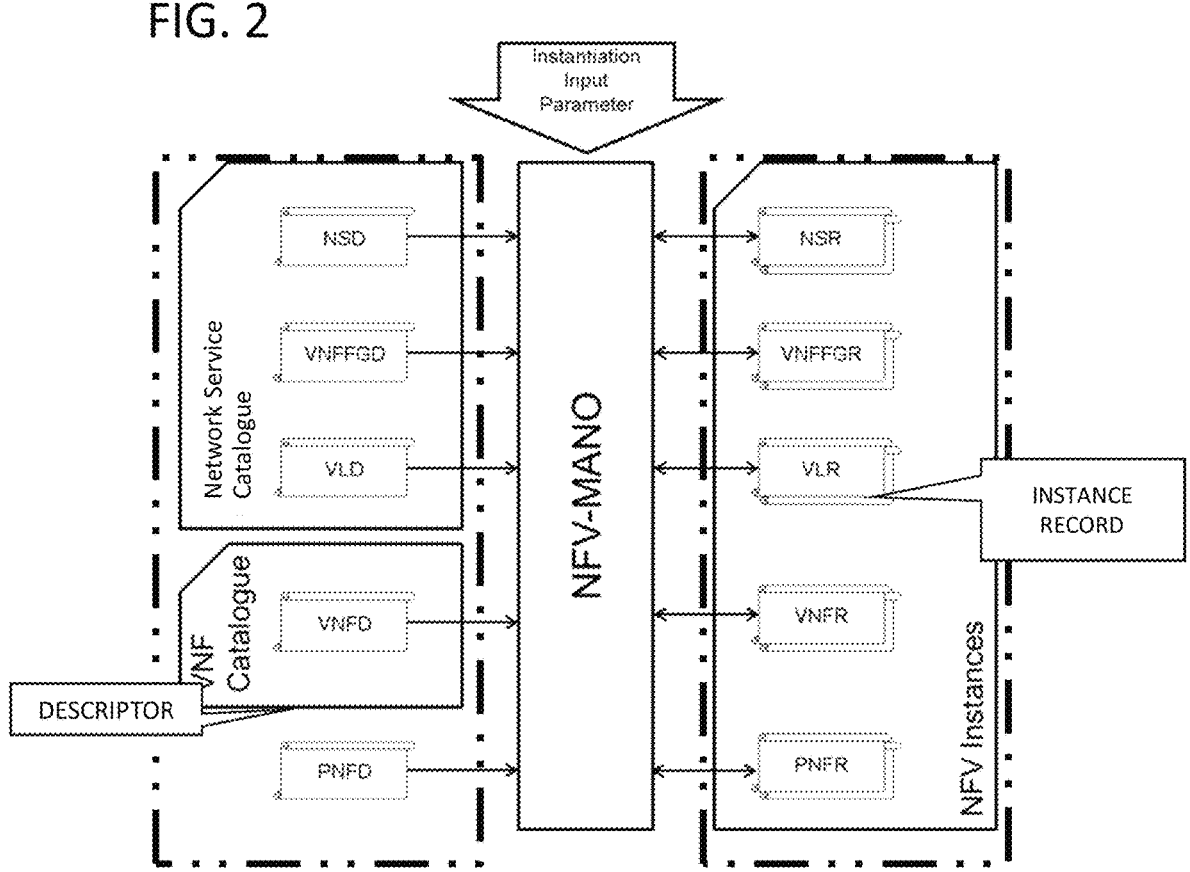
FIG. 2 is a diagram illustrating templates and instance records according to Non-Patent Literature (cited from FIG. 6.2 in Non-Patent Literature 1).
Figure 3:
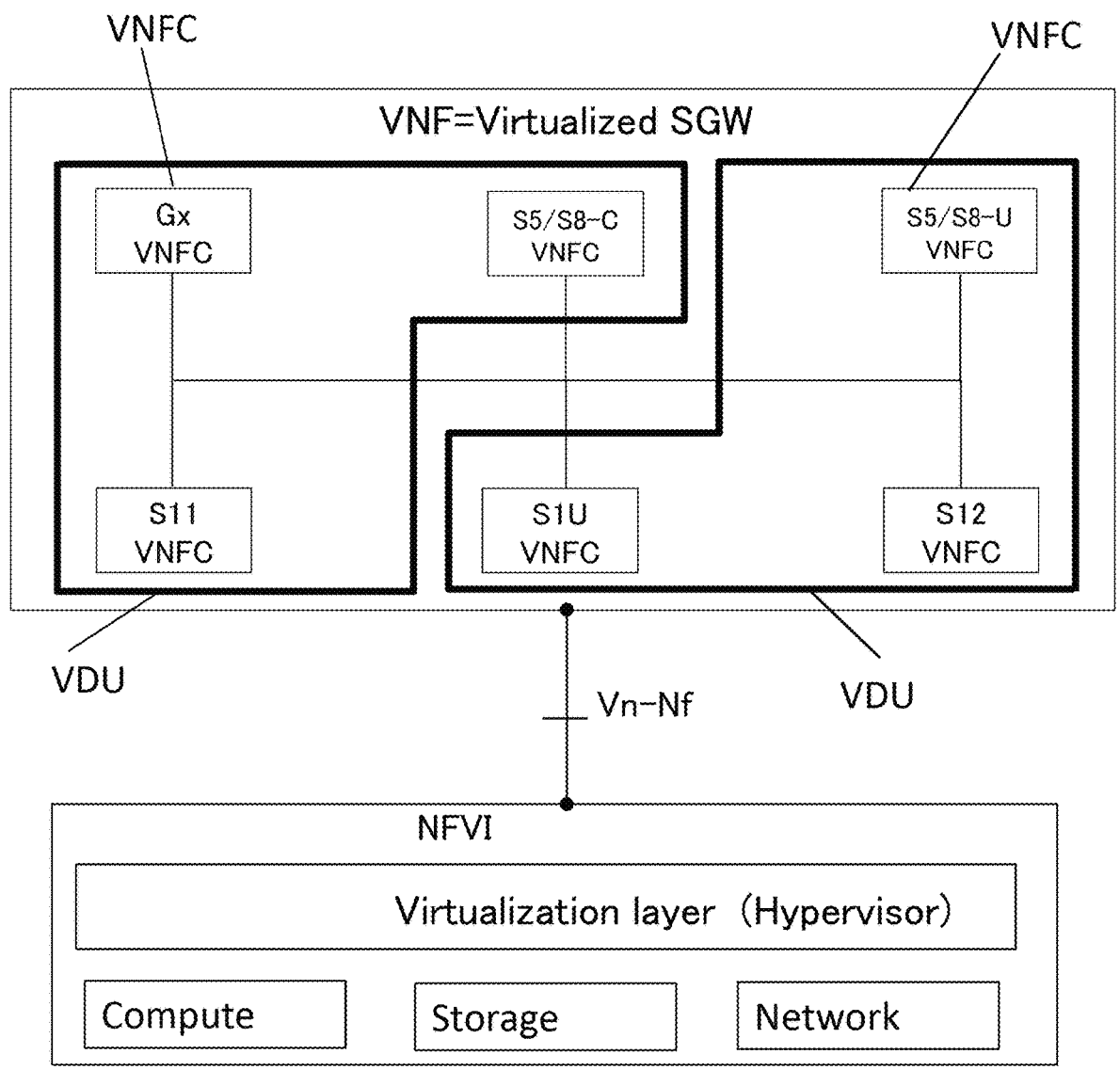
FIG. 3 is a diagram illustrating a relationship among a VNF, VNFCs, and VDUs.
Figure 4:
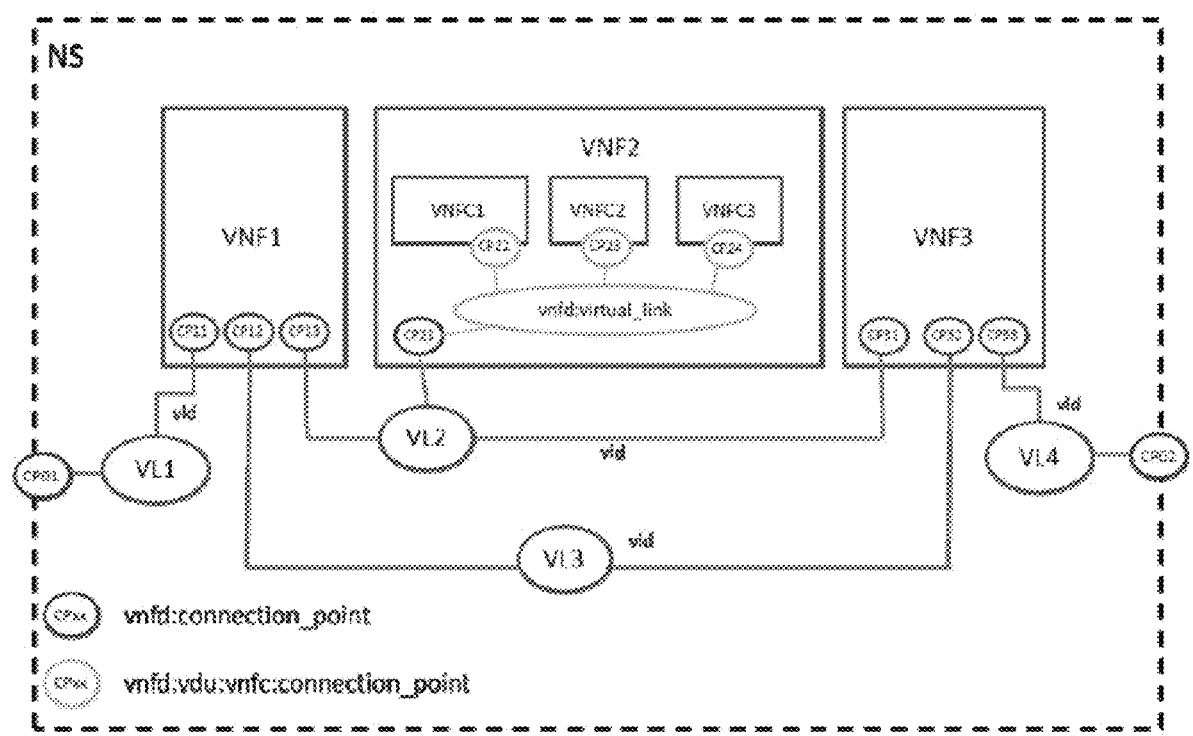
FIG. 4 is a diagram schematically illustrating a logical relationship among descriptors (cited from FIG. 6.4 in Non-Patent Literature 1).

Referring to FIG. 11, the VNF descriptor (vnfd) includes information elements (entries) of one to N (N being an integer equal to 1 or more) virtual machine names (VM names) on the same layer as a vdu, a Virtual Link, Connection Points, and a Deployment Flavor. These information elements (VM names) are connected as end nodes (Leaves) in a structure of the VNF descriptor. NNFV-MANO (see FIG. 2) generates each VM name based on the naming rule of the VM name for the VM in the descriptor, using an instantiation operation.

Figure 12:
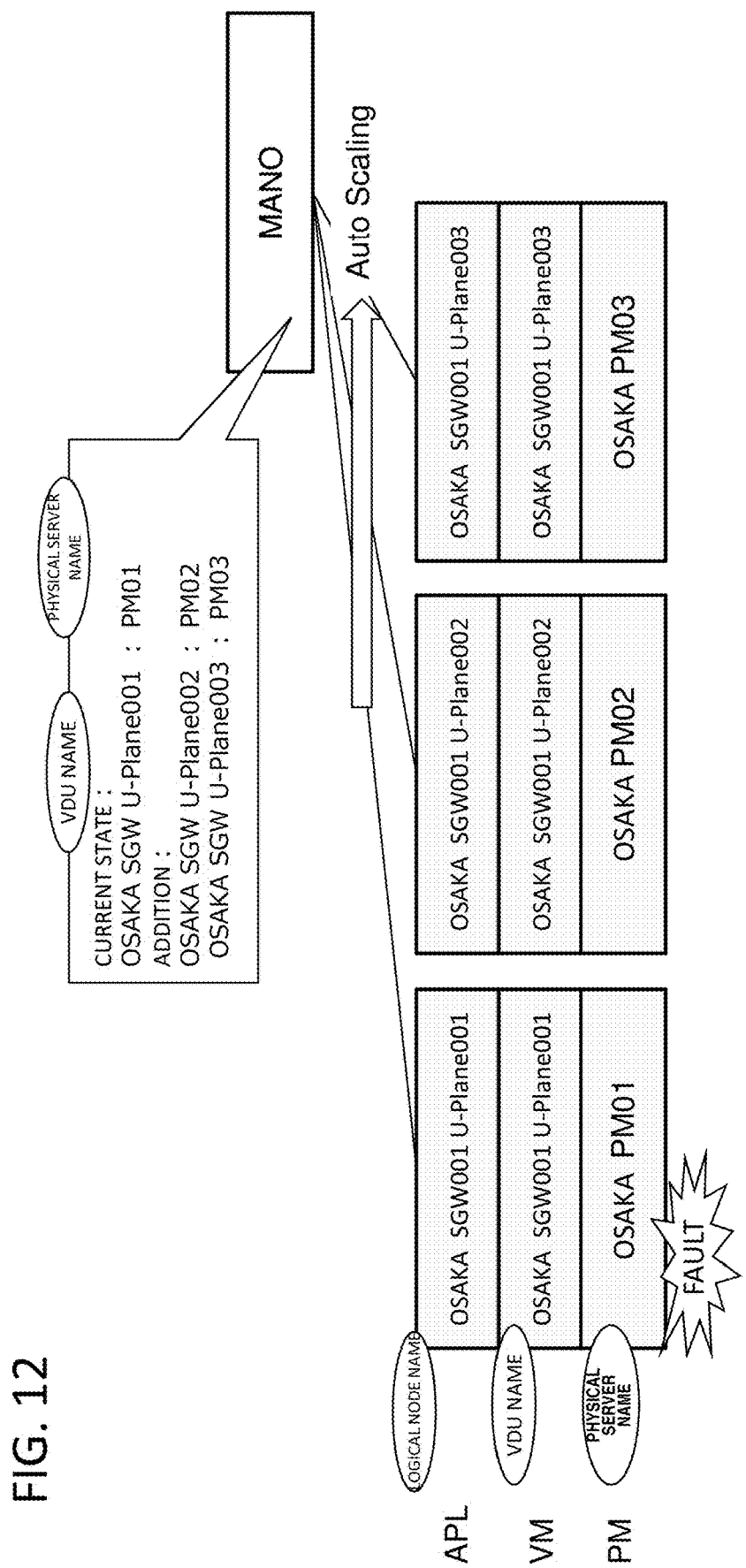
FIG. 12 is a diagram illustrating an example of scaling-out of VMs in the exemplary embodiment.

FIG. 12 is a diagram illustrating a specific example of the present exemplary embodiment. FIG. 12 illustrates respective names (a physical server name, a VDU name, and a logical node name) of a physical machine PM (Physical Machine), a virtual machine VM (Virtual Machine), and an application (APL) on the virtual machine, corresponding to servers before and after scaling-out (where two servers are added). The following describes a case where NFV-MANO executes auto scale-out, as a result of detection of a fault, congestion, or the like, in a server apparatus having
a physical server name: PM01,
a VDU name: OsakaSGW001 U-Plane001, and
a logical node name: OsakaSGW001 U-Plane001.

One of the two servers to be added is one having a physical server name: PM02 and a VM name (VDU name) of OsakaSGW001 U-Plane002. The other of the two servers to be added is the one having
a physical server name: PM03 and
a VM name (VDU name) of OsakaSGW001 U-Plane003.

These VM names are each created as an instance name (VDU name) by instantiation by NFV-MANO according to the description of the information element of the VM name (VM names) that has defined the naming rule for the VM.

To take an example, the naming rule for the VM set in the information element of the VM name (VM name) of the VNF descriptor is set to "OsakaSGW001 U-Plane" && "++integer-value". Then, the initial value of the integer-value is set to 0. At a time of instantiation, for example, the "integer-value" following the character string (character string) of the "Osaka SGW001 U-Plane" is auto-incremented (automatically incremented by 1) due to "++integer-value" in the rule, a resulting integer value is converted to a character string of three decimal digits (such as "002"), and the character string of "002" is concatenated to the character string of "OsakaSGW001 U-Plane) using an operator "&&", thereby generating the VDU name of "OsakaSGW001 U-Plane002" or the like.

Therefore, the names of "OsakaSGW001 U-Plane002" and "OsakaSGW001 U-Plane003" are respectively assigned to second and third, VMs added by auto scaling (auto-scale V-MANO). That is, according this exemplary embodiment, distinction can be made, in terms of management.

An operator ++ in the "++integer-value" of the instruction rule is given as the simplest example among examples of naming rule for the auto-increment (in which on syntax of the naming rule is arbitrary). Naturally, the present invention is not limited to such a naming rule. To take an example, in place of the "OsakaSGW001 U-Plane "++ integer-value"", an instruction of inserting a text code of a "building name" in place of a field of "Osaka" as an argument (variable) of the naming rule may be embedded. When orchestration is performed, NFVO may select a building or the like with sufficient resources (resources), for example. In that case, it may be so arranged that an instruction of automatically inserting "building name" is specified as the naming rule, and NFVO gives VM name (VDU name) by referring to repository information of NFVI and VNF that NFVO manages at the time of the orchestration.

Figure 13:
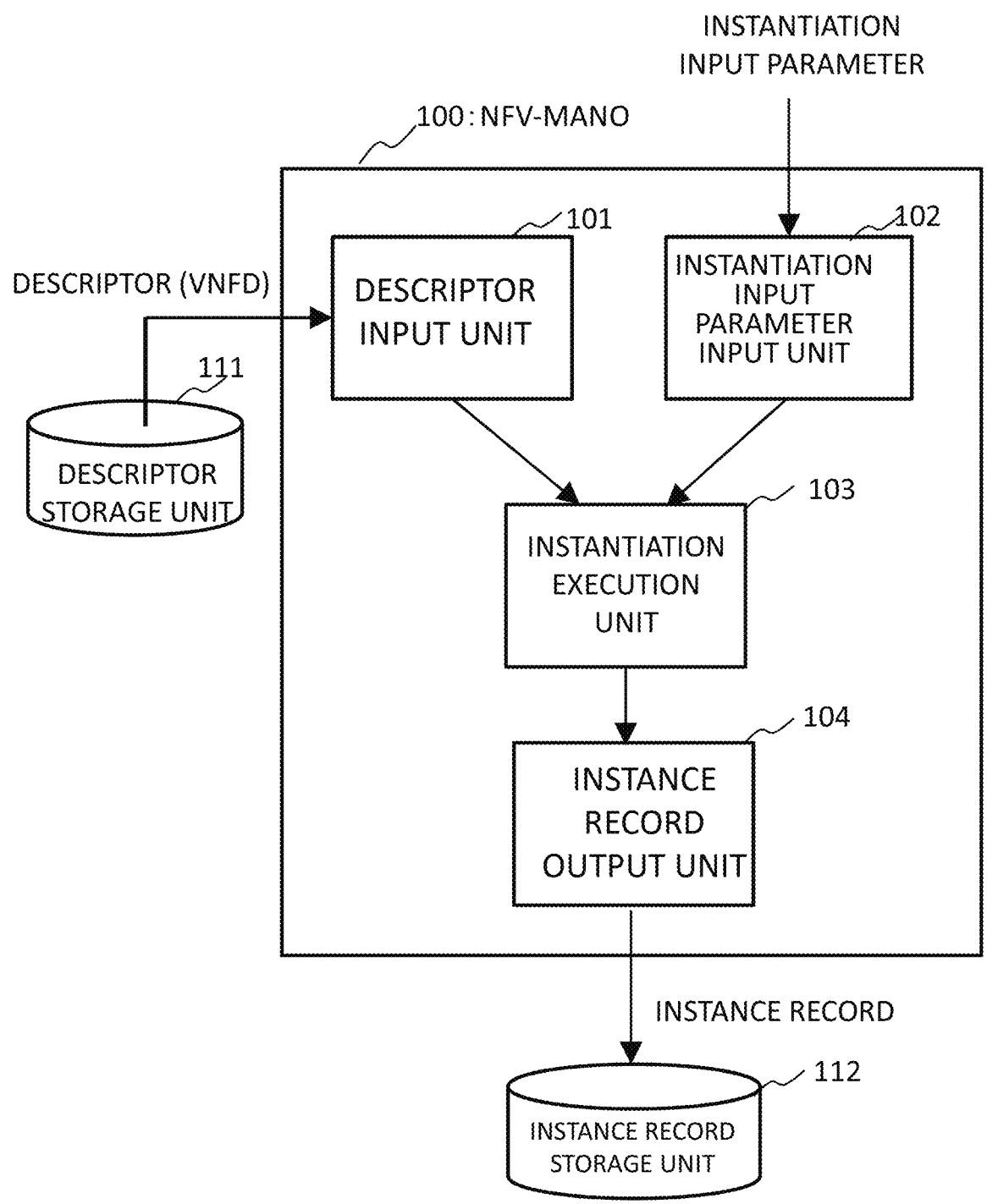
FIG. 13 is a diagram illustrating NFV-MANO configured to process the descriptor in the exemplary embodiment.

FIG. 13 is a diagram illustrating NFV-MANO (in FIG. 2) configured to execute a process of loading the VNF descriptor (vnfd) in this exemplary embodiment described with reference to FIGS. 10 and 11 and generating an NFV instance. The process may be implemented in NFVO, VFNM, or the like of NFV-MANO as a program. In this case, a processor (CPU (Central Processing Unit)), not shown, which constitutes NFVO, VNFM, or the like of the NFV-MANO loads the program stored in a semiconductor memory, an HDD (Hard Disk Drive), or the like into a main memory, and executes the program, thereby implementing a VNF descriptor loading process from the storage unit and an NFV instance creation process.

NFV-MANO 100 includes a descriptor input unit 101 configured to receive the VNF descriptor (vnfd) (including an information element of a VM name) in this exemplary embodiment illustrated in FIG. 10 and so on, an instantiation input parameter input unit 102 configured to receive an instantiation input parameter, an instantiation execution unit 103 configured to execute an instantiation operation, and an instance record output unit 104 configured to output an instance record. The instance record and data are stored in an instance record storage unit 112.

For example, from OSS/BSS or VNFM to NFVO, NS (Network Service) or VNF instantiation operation is executed. The instantiation input parameter is used to customize network service NS or VNF to specific instantiation, for example. As the instantiation input parameter, information for identifying a deployment flavor (Deployment Flavor) to be used, and VNF and PNF to be incorporated by the instantiation operation are referred to. The instantiation execution unit 103 creates records (NSR, VNFR, VLR, VNFFGR and so forth) indicating a newly created instance. Each record created based on information given by each descriptor and additional runtime information related to a component instance, provides a data group necessary for modeling a state of a network service (NS) instance, VNF instance, VNFFG instance, or VL (Virtual Link) instance. Distinction among instances such as a plurality of VMs (VDUs) that have been created can be made by names (such as VDU names).

In the above-mentioned exemplary embodiment, the description has been given, using, as an example, virtual machines (VMs) instantiated based on information on the descriptor or the like. With respect to VNF, VNFC, and VDU as well, by including an information element for setting a name (naming rule) to be associated with an instance to be created, distinction among instances (VNF, VNFC, and VDU) created based on the descriptor is made possible, in terms of management.

Each disclosure of the above-listed Non-Patent Literature is incorporated herein by reference. Modification and adjustment of each exemplary embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept.

The invention claimed is:

1. A network functions virtualization management and orchestration method comprising:
receiving, from a storage unit, a VNF (Virtualized Network Function) descriptor (VNFD) that includes an information element including a naming rule that defines how to regularly and variably generate a plurality of different names to be allocated respectively to a plurality of virtual machine (VM) instances in creating the plurality of the VM instances; and
creating the plurality of the VM instances that are able to be distinguished by name from one another, by applying the naming rule included in the VNFD in common to the plurality of VM instances.

2. The network functions virtualization management and orchestration method according to claim 1, wherein the naming rule of the information element includes a variable and an operator indicating an operation applied on the variable for regularly generating, from the variable, a plurality of different values that are included respectively as character strings in a plurality of names allocated to the plurality of the VM instances.

3. The network functions virtualization management and orchestration method according to claim 2, comprising:
   providing, in the VNFD, the information element that includes the naming rule on a same layer as information elements of an ID (Identifier) and a VDU (Virtualized Deployment Unit) of the VNFD.

4. A network functions virtualization management and orchestration system, comprising:
   a processor; and
   a memory storing program instructions executable by the processor,
   wherein the processor is configured to: receive, from a storage unit, a VNF (Virtualized Network Function) descriptor (VNFD) that includes an information element including a naming rule that defines how to regularly and variably generate a plurality of different names to be allocated respectively to a plurality of virtual machine (VM) instances in creating the plurality of the VM instances; and
   create the plurality of the VM instances that are able to be distinguished by name from one another, by applying the naming rule included in the VNFD in common to the plurality of VM instances.

5. The network functions virtualization management and orchestration system according to claim 4, wherein the naming rule of the information element includes a variable and an operator indicating an operation applied on the variable for regularly generating, from the variable, a plurality of different values that are included respectively as character strings in a plurality of names allocated to the plurality of the VM instances.

6. The network functions virtualization management and orchestration system according to claim 5, wherein the information element that includes the naming rule is provided in the VNFD on a same layer as information elements of an ID (Identifier) and a VDU (Virtualized Deployment Unit) of the VNFD, to allow a plurality of instances created based on the VNFD to be distinguished by name.

7. A non-transitory computer-readable recording medium storing therein a program causing a computer to execute processing comprising:
   receiving, from a storage unit, a VNF (Virtualized Network Function) descriptor (VNFD) including an information element that includes a naming rule that defines how to regularly and variably generate a plurality of different names to be allocated respectively to a plurality of virtual machine (VM) instances in creating the plurality of the VM instances; and
   creating the plurality of the VM instances that are able to be distinguished by name from one another, by applying the naming rule included in the VNFD in common to the plurality of VM instances.

8. The non-transitory computer-readable recording medium storing therein a program according to claim 7, wherein the naming rule of the information element includes a variable and an operator indicating an operation applied on the variable for regularly generating, from the variable, a plurality of different values that are included respectively as character strings in a plurality of names allocated to the plurality of the VM instances.

9. The non-transitory computer-readable recording medium storing therein a program according to claim 8, wherein the information element that includes the naming rule is provided in the VNFD on a same layer as information elements of an ID and a VDU (Virtualized Deployment Unit).

* * * * *